United States Patent
Blanchon et al.

(10) Patent No.: US 8,473,120 B2
(45) Date of Patent: Jun. 25, 2013

(54) METHOD FOR ASSISTING IN THE MANAGEMENT OF THE FLIGHT OF AN AIRCRAFT IN ORDER TO KEEP TO A TIME CONSTRAINT

(75) Inventors: Xavier Blanchon, Toulouse (FR); Philippe Chaix, Tournefeuille (FR); Christophe Caillaud, Blagnac (FR)

(73) Assignee: Thales, Neuilly sur Seine (FR)

(*) Notice: Subject to any disclaimer, the term of this patent is extended or adjusted under 35 U.S.C. 154(b) by 657 days.

(21) Appl. No.: 12/624,725

(22) Filed: Nov. 24, 2009

(65) Prior Publication Data
US 2010/0131125 A1    May 27, 2010

(30) Foreign Application Priority Data
Nov. 25, 2008 (FR) .................. 08 06621

(51) Int. Cl.
*G05D 1/00* (2006.01)
(52) U.S. Cl.
USPC .................. 701/3; 701/465; 701/467
(58) Field of Classification Search
None
See application file for complete search history.

(56) References Cited

U.S. PATENT DOCUMENTS

| | | | |
|---|---|---|---|
| 4,760,530 A | 7/1988 | Liden | |
| 4,774,670 A * | 9/1988 | Palmieri | 701/3 |
| 5,121,325 A | 6/1992 | DeJonge | |
| 6,061,612 A | 5/2000 | Sainthuile et al. | |
| 6,507,782 B1 | 1/2003 | Rumbo et al. | |
| 6,922,703 B1 | 7/2005 | Snyder et al. | |
| 7,499,771 B2 | 3/2009 | Caillaud | |
| 8,010,267 B2 * | 8/2011 | Klooster et al. | 701/66 |
| 8,150,588 B2 * | 4/2012 | Klooster | 701/66 |
| 2003/0139876 A1 * | 7/2003 | Shinagawa | 701/204 |
| 2005/0216140 A1 * | 9/2005 | Bouchet | 701/3 |
| 2008/0155544 A1 | 6/2008 | Soussiel et al. | |
| 2008/0228333 A1 * | 9/2008 | De Menorval et al. | 701/14 |
| 2009/0259351 A1 * | 10/2009 | Wachenheim et al. | 701/7 |

FOREIGN PATENT DOCUMENTS

| | | |
|---|---|---|
| EP | 0250140 A2 | 12/1987 |
| WO | 02/093281 A1 | 11/2002 |
| WO | 2008/141953 A1 | 11/2008 |

OTHER PUBLICATIONS

U.S. Appl. No. 12/446,724, filed Apr. 22, 2009, national stage of WO 08/141953.

* cited by examiner

*Primary Examiner* — Michael J Zanelli
(74) *Attorney, Agent, or Firm* — Stroock & Stroock & Lavan LLP

(57) ABSTRACT

The invention relates to the field of civil aviation and, more specifically, relates to the flight management systems, more commonly known by the English acronym FMS. The method for assisting in the management of the flight of an aircraft in order to keep to a time constraint according to the present invention allows for a control of the keeping to the time constraint that presents a rapid dynamic, by avoiding as far as possible having the estimated time of arrival (ETA) at a particular point (P) able to drift relative to a required time of arrival (RTA) at said particular point (P), thanks to the use of a maneuvering margin (M) granted to the guidance module of the aircraft.

8 Claims, 4 Drawing Sheets

METHOD FOR ASSISTING IN THE MANAGEMENT OF THE FLIGHT OF AN AIRCRAFT IN ORDER TO KEEP TO A TIME CONSTRAINT

CROSS REFERENCE TO RELATED APPLICATIONS

This application claims priority under U.S.C. §119 to French Patent Application No. 08 06621, filed Nov. 25, 2008, the entire contents of which is hereby incorporated by reference in its entirety.

TECHNICAL FIELD

The present invention relates to a method for assisting in the management of the flight of an aircraft, making it possible to favour keeping to a time constraint.

BACKGROUND OF THE INVENTION

The invention relates to the field of civil aviation and, more specifically, relates to the flight management systems, better known by the English acronym FMS, with which all civilian aircraft are nowadays equipped. An FMS is made up of various functional components that enable the crew of an aircraft to programme a flight from a navigation database. The FMS calculates lateral and vertical trajectories enabling the aircraft to reach its destination. These calculations are based on the characteristics of the aircraft, on the data supplied by the crew and on the system environment. The positioning and guidance functions then work together in order to enable the aircraft to remain on the trajectories defined by the FMS.

By improving the guidance speedwise of the aircraft, the invention aims to improve the possibilities of said aircraft in order to enable them to reach particular points at a required time, with a maximum of accuracy. This need devolves from the exponential increase in air traffic and the corresponding workload for air travel controllers. Thus, for safety reasons, but also for reasons of economic viability, it becomes essential to impose time constraints on the aircraft, notably in the approach phase. The aircraft are thus required to reach a particular waypoint in their flight plan at a required time. These particular points may be a landing runway threshold, a point of convergence of flows of aircraft, particularly busy crossing points, etc. This can make it possible, for example, to smooth the flow of aircraft before the approach phase.

These days, the FMS of an aircraft needs to handle the function of keeping to a time constraint, in other words it calculates optimized flight parameters, in order to reach particular points of the flight plan at precise times, in the most effective way possible and, for example, economically.

In order to keep to this time constraint, the FMS defines a speed strategy.

Hereinafter in the description and in the claims, the expression "speed strategy" will be understood to mean a speed profile assumed to have to be followed by the aircraft, the a priori function of the guidance module being to determine at any instant in the flight a setpoint speed, that the aircraft seeks to reach, aiming to observe said speed strategy.

Currently, the FMS of an aircraft consequently carries out prediction calculations in order to observe a required time of arrival at a particular waypoint of the flight plan, the time being commonly designated by the English acronym RTA (Required Time of Arrival); this requires it to determine the speed strategy. The FMS regularly calculates an estimated time of arrival at said particular waypoint, the time being commonly designated by the English acronym ETA (Estimated Time of Arrival). If the estimated time of arrival departs from a predetermined tolerance relative to the required time of arrival, a new cycle of calculations takes place, causing the FMS to redefine the trajectories to be followed by the aircraft, as well as the speed strategy.

Hereinafter in the description and in the claims, the expression "required time of arrival" will logically be understood to mean a time at which the aircraft must reach a particular point in its flight plan. The expression "estimated time of arrival" will be understood to mean a time at which the FMS of the aircraft predicts reaching said particular point, taking into account the current speed of the aircraft and weather conditions for example.

The defining of the speed strategy of an aircraft is an iterative process: on each loop, the FMS recalculates the trajectories to be followed, taking into account, for example, wind estimation models, and predicts an estimated time of arrival. The aim is to achieve convergence between the estimated time of arrival and the required time of arrival. This regular redefinition of the speed strategy is made necessary by the unavoidable calculation inaccuracies, due notably to the imperfections of the models. Thus, it is not a matter of control, but of reoptimization in open loop mode, performed at regular intervals.

Each calculation loop, comprising the calculation of trajectories and the definition of the speed strategy of the aircraft, requires a relatively long time, given the algorithmic complexity of said calculations to be made.

The tolerance with respect to the required time of arrival is generally modelled in the form of a funnel, that is to say that it is increasingly narrow as the aircraft approaches the particular waypoint. In practice, on approaching said particular waypoint, meeting the required time of arrival, that can be called RTA, demands increasing accuracy.

Now, each aircraft has a speed envelope, comprising a maximum speed profile and a minimum speed profile, said maximum and minimum speeds being able to vary according notably to the altitude and mass of the airplane. This speed envelope defines a speed envelope that can be achieved by the aircraft; the current FMSs therefore define the speed strategy within this speed envelope.

Moreover, the aircraft has a guidance module, notably comprising a speed guidance component. In current aircraft, the speed guidance conforms to the speed strategy calculated by the FMS.

The problem lies in the fact that the FMS of an aircraft has uncertain parameters, since the models lack accuracy, that prevent it, since the interpolation models are also imperfect, from determining a speed strategy that can be ensure that the time constraint is kept to in a certain manner.

Worse, the limitations of the speed envelope added to the inaccuracies of the prediction models may cause the FMS to predict keeping to the RTA up to a point where it has become impossible to correct a drift that is observed all of a sudden, for example following a change of wind conditions.

Currently, aircraft operators tend to give themselves a manoeuvring margin enabling them to keep to their time constraints. However, this empirical approach does not provide an adequate guarantee; furthermore, it tends to induce changes of speed of significant amplitude, that are sources of discomfort for the passengers and of excess fuel consumption.

Finally, the complexity of the calculations and the increasing uncertainty as the aircraft approaches the particular point at which it should arrive at a required time bring about the deactivation of the iterative systems for determining the trajectories and the speed strategy, for example three minutes before the time of arrival at said particular point.

One aim of the invention is notably to overcome the above-mentioned technical drawbacks. Thus, to ensure that an aircraft keeps to a time constraint, while limiting its complete changes of speed strategies, the present invention proposes adjusting the speed strategy through the intermediary of the speed guidance function of the aircraft, a function to which a manoeuvring margin is granted, the dynamic for calculating the speed setpoint used for the guidance being much faster than that induced by a complete calculation of the trajectories and of the speed strategy.

SUMMARY OF THE INVENTION

To this end, the subject of the invention is a method for assisting in the management of the flight of an aircraft making it possible to keep to a time constraint, and aiming to reach a constraint point at a required time of arrival, using an estimated time of arrival at said constraint point, said aircraft comprising a flight management system determining a speed strategy aiming to observe said required time of arrival at said constraint point, to within an absolute tolerance, said aircraft also presenting a theoretical speed envelope comprising a theoretical maximum speed profile and a theoretical minimum speed profile, the aircraft being able to reach any speed between said theoretical maximum and theoretical minimum speed profiles, the aircraft also comprising a guidance module making it possible to set a setpoint speed, that the current speed of the aircraft tends to equal, said setpoint speed being assumed to conform to said speed strategy, comprising the following steps:

- the definition of a constrained speed envelope comprising a constrained maximum speed profile and a constrained minimum speed profile, said constrained speed envelope being strictly included in the theoretical speed envelope,
- the generation by the flight management system of the speed strategy, said speed strategy necessarily being included in said constrained speed envelope, so that the guidance module has a manoeuvring margin enabling it to adjust the setpoint speed,
- the adjustment of the setpoint speed by the guidance module if the estimated time of arrival at the constraint point differs from the required time of arrival at said constraint point.

Advantageously, the step for adjusting the setpoint speed is implemented when the estimated time of arrival exceeds a guidance tolerance relative to the required time of arrival, said guidance tolerance being less than the absolute tolerance.

According to one embodiment of the method according to the invention, the theoretical speed envelope presenting a width corresponding to the difference between the theoretical maximum speed profile and the theoretical minimum speed profile, the constrained maximum speed profile may be less than the theoretical maximum speed profile by approximately 5% of the width of the theoretical speed envelope, and the constrained minimum speed profile is greater than the theoretical minimum speed profile by approximately 5% of the width of the theoretical speed envelope.

According to a preferred embodiment of the method according to the invention, the guidance module adjusts the setpoint speed by adding to the speed strategy a compensation equal to $$\left(\frac{D \times \delta T}{Te \times Te}\right),$$

in which D is the distance to be travelled by the aircraft to reach the constraint point, $\delta T$ is equal to the difference between the estimated time of arrival at the constraint point and the required time of arrival at the constraint point and Te is equal to the difference between the estimated time of arrival at the constraint point and the current time.

Preferably, the method according to the invention also comprises a step for deactivating said method implemented when the difference between the estimated time of arrival at the constraint point and the current time becomes less than approximately thirty seconds.

According to one possible implementation of the method according to the invention, the margin on the setpoint speed decreases when the distance to be travelled decreases.

Advantageously, a flight management system of an aircraft can implement the method for assisting in the management of the flight of an aircraft as described hereinbefore.

BRIEF DESCRIPTION OF THE DRAWINGS

Other features and benefits of the invention will become apparent from the following description, given in light of the appended drawings which represent.

DETAILED DESCRIPTION OF THE INVENTION

Figure 1:
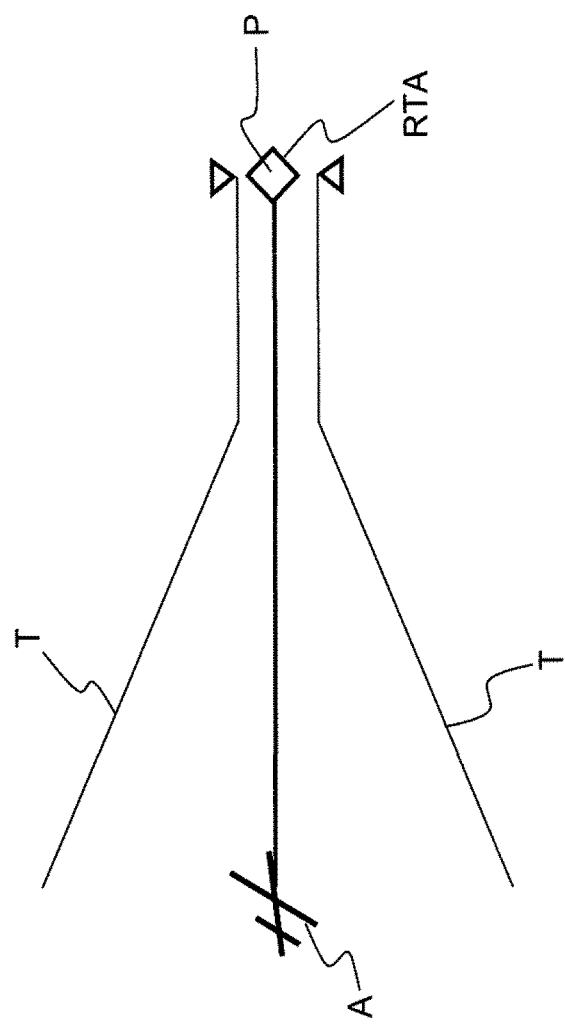
FIG. 1: the schematic illustration of a predetermined tolerance for the observation of a time constraint by an aircraft, according to the state of the art.

FIG. 1 presents a diagram aiming to indicate a conventional time constraint modelling principle. The aircraft A is thus "constrained" to reach the particular point P at the required time RTA by observing the predetermined tolerance, that will be called absolute tolerance T, on this required time. The particular point P may be, as has already been stated, a landing runway threshold, or a point of convergence of traffic flows for example.

The flight management system, generally called FMS, of the aircraft A, calculates, in addition to the lateral and vertical trajectories, a speed strategy that should enable the aircraft A to satisfy the time constraint. In the state of the art, the guidance module uses the speed strategy defined by the FMS to determine the setpoint speed used for guidance. At regular intervals, the FMS determines an estimated time of arrival at the particular point P, taking into account the current speed of the aircraft A, behaviour models of the aircraft A, wind stimulation modules, etc. If this estimated time of arrival departs from the absolute tolerance T modelled in FIG. 1, the FMS restarts a cycle of calculations aiming to define a new speed strategy, and thus, possibly, new lateral and vertical trajectories. Now, on the one hand, this absolute tolerance T becomes increasingly narrow as the aircraft A approaches the particular point P, increasing the risk of error, and on the other hand, the complete calculation cycle performed by the FMS to determine the new speed strategy and update the trajectories takes a long time, of the order of a few tens of seconds when the flight plan is particularly long. The two main detrimental consequences of this state of affairs have already been explained hereinabove:

The FMS may notice drift on the estimated time of arrival relative to the required time of arrival too late, so that it is impossible to correct this drift.

Since the time is takes for the FMS to calculate a new speed strategy and new lateral and vertical trajectories is relatively long, this function is deactivated at a few minutes of flight, for example three minutes, from the particular point, so that the estimated time of arrival may drift relative to the required time of arrival during this time lapse of a few seconds.

Because, notably, of the increase in air traffic, the time constraints imposed on aircraft are increasingly severe, for example reaching ten or so seconds 95% of the time in the approach phase. The abovementioned drawbacks are consequently increasingly detrimental.

Figure 2:
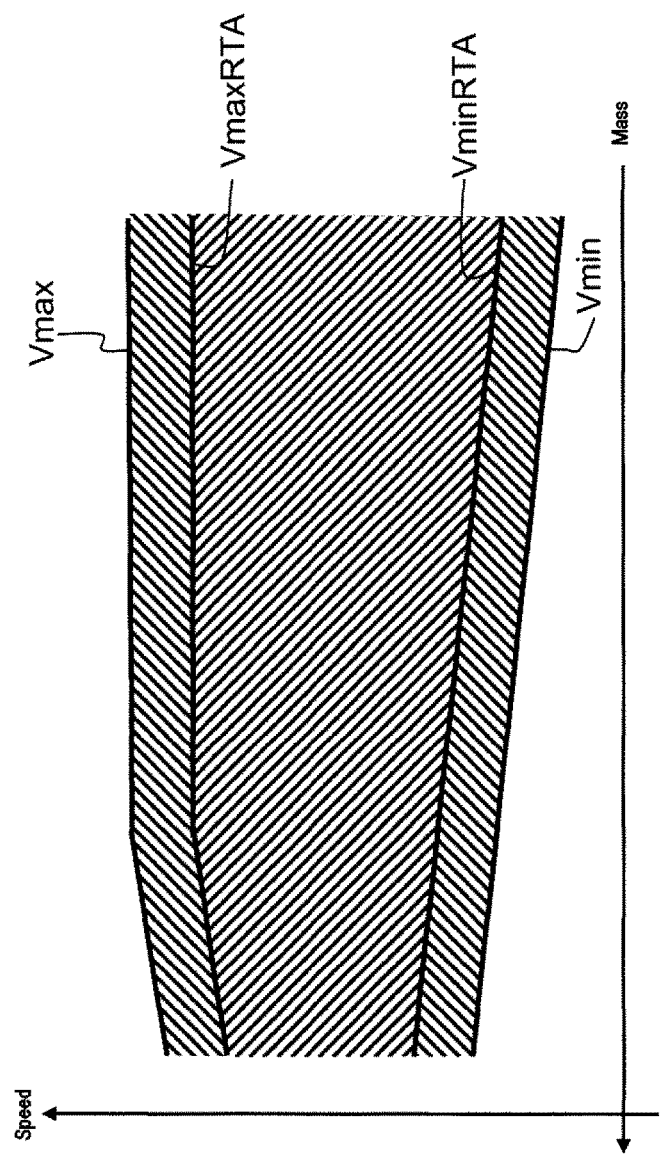
FIG. 2: a diagram of the speed envelopes, functions of the mass applicable to an aircraft in the method according to the invention.

FIG. 2 illustrates one aspect of the method for assisting in the management of the flight of an aircraft in order to keep to a time constraint according to the invention. The diagram indicates the possible speeds of the aircraft A as a function of its mass. It is known that aircraft have a theoretical speed envelope, comprising a theoretical maximum speed profile Vmax and a theoretical minimum speed profile Vmin. These speed profiles vary as a function of the mass of the aircraft and/or its altitude, and, of course, the intrinsic performance characteristics of the aircraft. Current FMSs define the speed strategy of aircraft within this speed envelope. The aim of the invention is to limit the changes of speed strategy and favour observation of the timetable constraints by aircraft. For this, the solution recommended by the invention is to divide up the speed envelope between the function for defining the speed strategy established by the FMS and the function for guiding the aircraft A. In the current systems, the guidance function strictly conforms to the speed strategy established by the FMS: it sets a setpoint speed that the current speed of the aircraft is required to equal. The invention proposes restricting the speed envelope available for the FMS in order to establish the speed strategy. A constrained speed envelope is therefore defined, comprising a constrained maximum speed profile VmaxRTA and a constrained minimum speed profile VminRTA, still dependent on the mass of the aircraft, as shown by FIG. 2, but also its altitude and its intrinsic performance characteristics. This constrained speed envelope, that can also be called "sub-envelope", can be defined in different ways, as a function, for example, of the flight phase and of the distance to the particular point P.

The amplitude of this constrained speed envelope is less than that of the theoretical speed envelope, for example by approximately 10%, the constrained maximum speed profile VmaxRTA being typically less than the theoretical maximum speed profile Vmax by approximately 5% of the amplitude of the theoretical speed envelope, the constrained minimum speed profile VminRTA being at the same time greater than the theoretical minimum speed profile Vmin by approximately 5% of the amplitude of the theoretical speed envelope. This approach enables the guidance module to have a manoeuvring margin for defining the setpoint speed.

Figure 3:
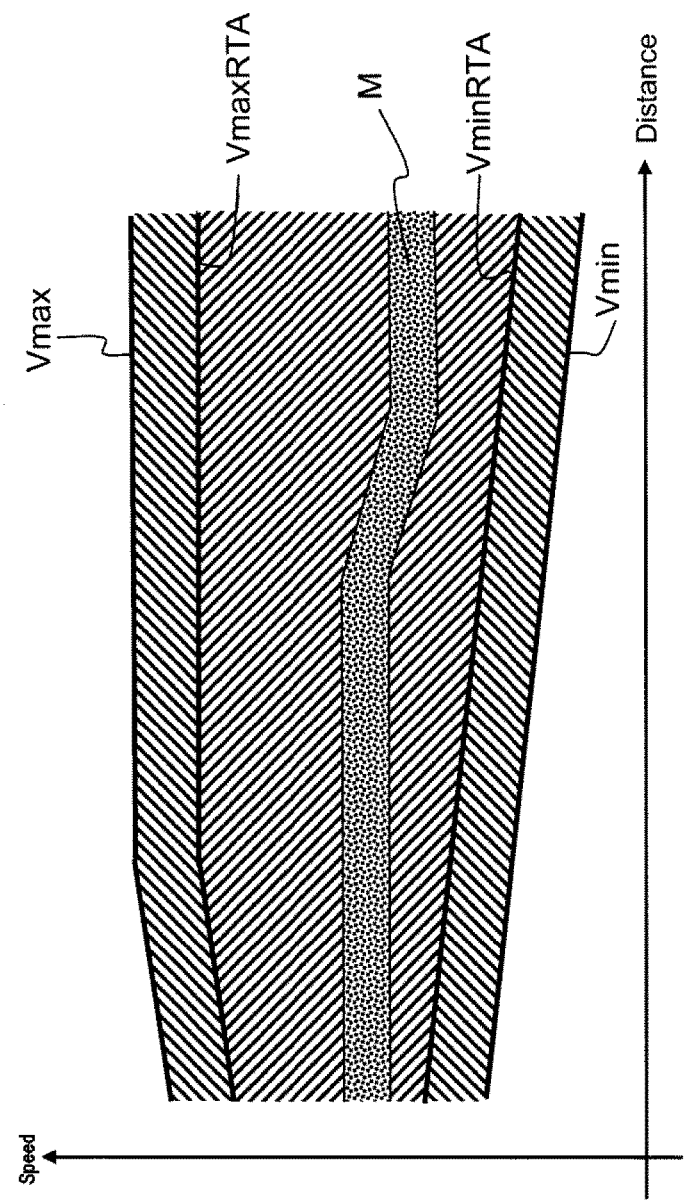
FIG. 3: a diagram of the speed envelopes, functions of the distance remaining to be travelled, showing a margin on the setpoint speed for the guidance module, in the method according to the invention.

FIG. 3 is a diagram representing the theoretical and constrained speed envelopes as a function of the distance travelled, and the manoeuvring margin M available to the guidance module, for an aircraft in which the method according to the invention is implemented.

An exemplary method for determining the speed strategy of an aircraft that can be established by an FMS of the state of the art is given here. Such a method can be based on optimizing the cost index, as is described in the French patent application No. 0703912.

It is also possible to give an example of modelling the absolute tolerance T on the required time of arrival RTA at the particular point P, as defined in FIG. 1: this absolute tolerance T may be of the order of a minute for each hour of flight separating the aircraft A from the particular point P, then of the order of 30 seconds for all of the last half-hour of flight.

Consequently, the models for establishing the speed strategy and defining the absolute tolerance T possibly being those described hereinabove, the FMS of the aircraft A defines a speed strategy contained within the constrained speed envelope; if the estimated time of arrival at the particular point P calculated by the FMS departs from the absolute tolerance T relative to the required time of arrival RTA at the particular point P, the FMS calculates a new speed strategy.

However, in addition, in the method according to the invention, a guidance tolerance on the estimated time of arrival relative to the required time of arrival that is far tighter than the absolute tolerance T is defined. It is possible to decide, for example, that it should be 30 seconds per hour of flight separating the aircraft A from the particular point P, then 10 seconds for the entire last half-hour of flight. If the estimated time of arrival departs from this guidance tolerance relative to the required time of arrival, the guidance module can adjust the setpoint speed in order to avoid any drift. This adjustment is made possible, regardless of the current speed strategy, by the manoeuvring margin M available because of the definition of a constrained speed envelope for the speed strategy.

Now, the calculation loop performed by the guidance module in order to determine the setpoint speed may be very short because it does not aim to define any complete speed strategy or redefine lateral and vertical trajectories, unlike the FMS in current aircraft. This is why it is possible to be servo-controlled to a guidance tolerance that is much stricter with respect to the time constraint.

For example, if the guidance module measures a difference $\delta T$ between the estimated time of arrival and the required time of arrival RTA, this difference $\delta T$ being greater than the guidance tolerance, said guidance tolerance being stricter, for example, by a ratio of two, than the absolute tolerance T, when the aircraft A still has a distance D to travel to reach the particular point P, then, by using Te to denote the duration separating the current time from the estimated time of arrival, the guidance module can add to the setpoint speed as deduced from the speed strategy established by the FMS a compensation speed $\Delta V$ such that $$\Delta V = \left(\frac{D \times \delta T}{Te \times Te}\right).$$

This corrective compensation speed must, of course, remain less than the manoeuvring margin M available to the guidance module.

The risk of failure to observe the time constraint is therefore minimized because the method according to the invention generally makes it possible to avoid any possibility of drift of the estimated time of arrival relative to the required time of arrival RTA.

It may also be noted that the relative operational capacity limitation devolving from the use of the method according to the invention—a required time of arrival may be assumed out of reach, because of the limitation of the speed envelope to the constrained speed envelope, even though the aircraft is capable of reaching the speed needed to keep to the time constraint—is more than compensated by the fact that the uncertainties on the determination of the estimated time of arrival are such, when it is necessary to approach the limits of the speed envelope, that the probabilities of success of the strategy consisting in not granting a manoeuvring margin to the guidance module are very low relative to the objective of keeping to the time constraint.

Figure 4:
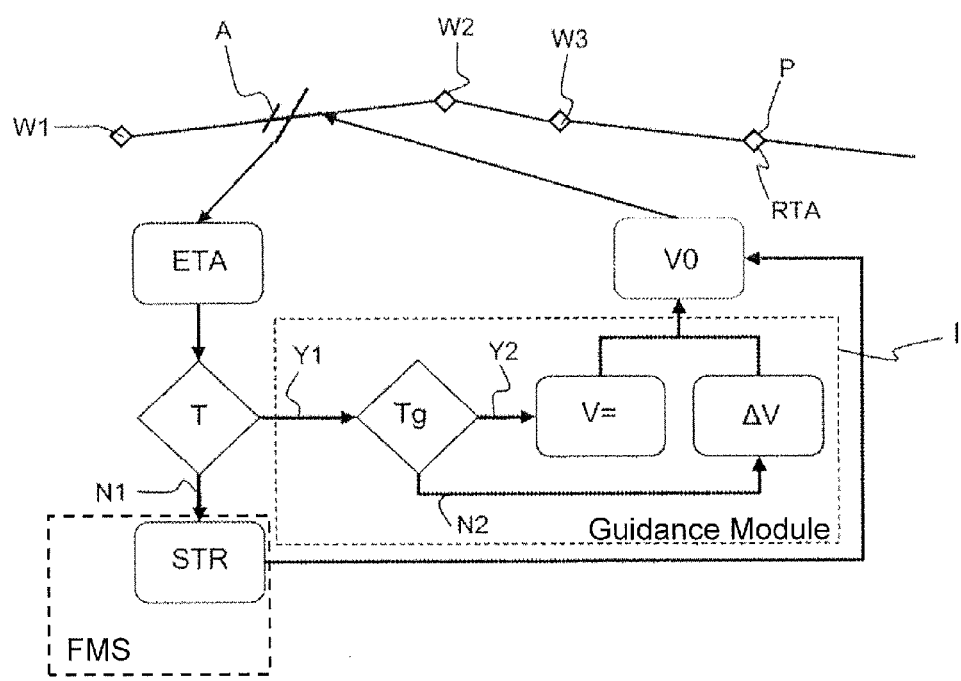
FIG. 4: a collaborative diagram of the various steps in determining the setpoint speed of an aircraft, comprising the method according to the invention.

FIG. 4 constitutes a summary of the invention. In this diagram of FIG. 4, the method according to the invention is represented by the method I.

To sum up, the aircraft A following any flight plan comprising any waypoints W1, W2, W3, is subject to a time constraint: it needs to be at a particular point P at the required time of arrival RTA. An estimated time of arrival ETA at the particular point P is calculated, for example by the FMS of the aircraft A. This estimated time of arrival ETA is compared to the required time of arrival RTA:

If the absolute tolerance T is not observed—as in the case N1—said FMS recalculates a new speed strategy STR, which entails extensive calculations: this corresponds to the state of the art.

If the absolute tolerance T is observed—as in the case Y1—the method for assisting in the management of the flight according to the invention is implemented: a check will be made to see if the guidance tolerance Tg is observed, said guidance tolerance Tg being, as will be recalled, much stricter than the absolute tolerance T. If it is observed—as in the case Y2—the setpoint speed V0, that the current speed of the aircraft A has to equal, is kept conformal—denoted V= in the figure—to that previously defined for observing the time of arrival (the speed defined by the speed strategy established by the FMS possibly corrected in a preceding step). If it is not observed—as in the case N2—a compensation speed ΔV is added to that defined in the speed strategy established by the FMS, for example according to the formula described previously:

$$\Delta V = \left( \frac{D \times \delta T}{Te \times Te} \right)$$

in order to define a new setpoint speed V0. This requires only light calculations, not involving a new speed strategy or new trajectories.

It must be noted that, even in the context of the implementation of the method according to the invention, the speed correction ΔV to be applied to the setpoint speed V0 tends to become increasingly great to correct one and the same time difference as the aircraft A approaches the particular point P. Consequently, a compromise making it possible to adjust the accuracy with which the time constraint is kept to versus the impact on the speed variations of the aircraft must be established.

Consequently, the invention offers the main advantage of better control in keeping to a time constraint. By avoiding as far as possible having the estimated time of arrival ETA at a particular point P drift relative to a required time of arrival RTA at said particular point P, thanks to the use of a manoeuvring margin granted to the guidance module, the method according to the invention provides for control in keeping to the time constraint that offers a fast dynamic.

Consequently, whereas in the state of the art the function for redefining the speed strategy, with a slow dynamic, has to be deactivated a few minutes before the arrival of the aircraft at the particular point, because of excessive inaccuracies, the method according to the invention, with a faster dynamic, can remain active much closer to the particular point, up to approximately thirty seconds from said particular point.

The improvements relative to the current situation affect not only the increased comfort of the passengers and the reduced stress on the crews because of the reduced number of complete changes of speed strategy, but also the reduction in the workload of air traffic controllers because of the reduction in the rates of missed time constraints.

The invention claimed is:

1. Method for assisting in the management of the flight of an aircraft making it possible to keep to a time constraint, and aiming to reach a constraint point at a required time of arrival, using an estimated time of arrival at said constraint point, said aircraft comprising a flight management system determining a speed strategy aiming to observe said required time of arrival at said constraint point, to within an absolute tolerance, said aircraft also presenting a theoretical speed envelope comprising a theoretical maximum speed profile and a theoretical minimum speed profile, the aircraft being able to reach any speed between said theoretical maximum and theoretical minimum speed profiles, the aircraft also comprising a guidance module making it possible to set a setpoint speed, that the current speed of the aircraft tends to equal, said setpoint speed being assumed to conform to said speed strategy, comprising the following steps:

the definition of a constrained speed envelope comprising a constrained maximum speed profile and a constrained minimum speed profile, said constrained speed envelope being strictly included in the theoretical speed envelope, the generation by the flight management system of the speed strategy, said speed strategy necessarily being included in said constrained speed envelope, so that the guidance module has a manoeuvring margin enabling it to adjust the setpoint speed, the adjustment of the setpoint speed by the guidance module if the estimated time of arrival at the constraint point differs from the required time of arrival at said constraint point.

2. Method for assisting in the management of the flight of an aircraft according to claim 1, wherein the step for adjusting the setpoint speed is implemented when the estimated time of arrival exceeds a guidance tolerance relative to the required time of arrival, said guidance tolerance being less than the absolute tolerance.

3. Method for assisting in the management of the flight of an aircraft according to claim 1, the theoretical speed envelope presenting a width corresponding to the difference between the theoretical maximum speed profile and the theoretical minimum speed profile, wherein the constrained maximum speed profile is less than the theoretical maximum speed profile by approximately 5% of the width of the theoretical speed envelope, and in that the constrained minimum speed profile is greater than the theoretical minimum speed profile by approximately 5% of the width of the theoretical speed envelope.

4. Method for assisting in the management of the flight of an aircraft according to claim 3, wherein the guidance module adjusts the setpoint speed by adding to the speed strategy a compensation equal to $$\left(\frac{D \times \delta T}{Te \times Te}\right),$$

in which D is the distance to be travelled by the aircraft to reach the constraint point, δT is equal to the difference between the estimated time of arrival at the constraint point and the required time of arrival at the constraint point and Te is equal to the difference between the estimated time of arrival at the constraint point and the current time.

5. Method for assisting in the management of the flight of an aircraft according to claim 1, wherein the guidance module adjusts the setpoint speed by adding to the speed strategy a compensation equal to $$\left(\frac{D \times \delta T}{Te \times Te}\right),$$

in which D is the distance to be travelled by the aircraft to reach the constraint point, δT is equal to the difference between the estimated time of arrival at the constraint point and the required time of arrival at the constraint point and Te is equal to the difference between the estimated time of arrival at the constraint point and the current time.

6. Method for assisting in the management of the flight of an aircraft according to claim 1, comprising a step for deactivating said method implemented when the difference between the estimated time of arrival at the constraint point and the current time becomes less than approximately thirty seconds.

7. Method for assisting in the management of the flight of an aircraft according to claim 1, wherein the margin on the setpoint speed decreases when the distance to be travelled decreases.

8. System for managing the flight of an aircraft according to the method of claim 1, said system comprising:
- the flight management system; and
- the guidance module,
- wherein the flight management system is configured to generate the speed strategy based on the constrained speed envelope and the guidance module is configured to adjust the setpoint speed.

\* \* \* \* \*